(12) United States Patent
Imoto et al.

(10) Patent No.: US 8,026,313 B2
(45) Date of Patent: Sep. 27, 2011

(54) CURABLE POLYMER COMPOSITION

(75) Inventors: Katsuhiko Imoto, Settsu (JP); Tetsuo Shimizu, Settsu (JP); Masayuki Hayashi, Ichihara (JP); Tomohiro Iimura, Ichihara (JP); Eiji Kitaura, Ichihara (JP); Peter Cheshire Hupfield, Mid Glamorgan (GB)

(73) Assignee: Daikin Industries, Ltd., Osaka (JP)

( * ) Notice: Subject to any disclaimer, the term of this patent is extended or adjusted under 35 U.S.C. 154(b) by 159 days.

(21) Appl. No.: 12/514,935

(22) PCT Filed: Dec. 6, 2007

(86) PCT No.: PCT/JP2007/074066
§ 371 (c)(1),
(2), (4) Date: May 14, 2009

(87) PCT Pub. No.: WO2008/072716
PCT Pub. Date: Jun. 19, 2008

(65) Prior Publication Data
US 2010/0076158 A1    Mar. 25, 2010

(30) Foreign Application Priority Data
Dec. 8, 2006   (JP) .................. 2006-332198

(51) Int. Cl.
*C08L 9/00* (2006.01)
*C08L 27/12* (2006.01)
*C08L 29/00* (2006.01)
*C08L 31/00* (2006.01)
*C08L 33/02* (2006.01)
*C08L 33/04* (2006.01)
*C08L 35/02* (2006.01)
*C08L 45/00* (2006.01)

(52) U.S. Cl. ........ 525/199; 525/211; 525/220; 525/221; 525/222; 525/232

(58) Field of Classification Search ................ 525/199, 525/211, 220, 221, 222, 232
See application file for complete search history.

(56) References Cited

U.S. PATENT DOCUMENTS
3,969,308 A    7/1976   Penneck
5,530,063 A *  6/1996   Nagai et al. ................ 525/101

FOREIGN PATENT DOCUMENTS
EP    0 744 443 A2   11/1996
EP    0 978 526 A1    2/2000
JP    04-211445 A     8/1992

* cited by examiner

*Primary Examiner* — Nathan M Nutter
(74) *Attorney, Agent, or Firm* — Sughrue Mion, PLLC

(57) ABSTRACT

A curable polymer composition that is quickly curable to form a cured article having excellent adhesion and followability to a substrate and at least including (A) an acrylic copolymer having a hydrogen atom bonded to a silicon atom, (B) a compound having at least two aliphatic unsaturated bonds in one molecule thereof, (C) a fluoroolefin copolymer including vinylidene fluoride as main component, and (D) a catalyst for hydrosilylation reaction.

6 Claims, No Drawings

CURABLE POLYMER COMPOSITION

TECHNICAL FIELD

The present invention relates to a curable polymer composition useful as a weather resistant coating.

BACKGROUND ART

A curable polymer composition comprising an acrylic copolymer having a hydrolyzable silyl group formed by bonding of a hydrolyzable group to a silicon atom has so far been proposed as a coating composition curable with moisture in the air. The composition is of one component type and is excellent in curing workability, and a coating film thereby obtained is characterized by having good adhesion to an inorganic substrate, high hardness so as to be hardly damaged, and good weather resistance, corrosion resistance and stain resistance. However the composition has demerits in that adhesion to an organic substrate is poor, followability to a substrate is insufficient and post-processability of a coated article is inferior, and also weather resistance, corrosion resistance and stain resistance are not sufficiently satisfactory.

On the other hand, in the case of using a fluorine-containing resin for a coating, there is a problem in that treatment at high temperature is necessary for fixing after the coating, workability is not good and a coating film itself does not adhere to any of organic and inorganic substrates. Accordingly, in the case of a fluorine-containing copolymer being compatible with an acrylic resin, improvement in workability and adhesion by blending an acrylic resin having an —OH group in its cure site has been investigated. However since a blended product thus obtained is poor in compatibility with a curing agent (isocyanate compound, etc.) capable of reacting with the —OH group, there is a problem in that, for example, appearance, weather resistance, corrosion resistance, adhesion and other basic characteristics of a coating film are impaired.

Such being the case, JP4-211445A proposes a moisture curing polymer composition comprising a fluoroolefin copolymer mainly comprising vinylidene fluoride and an acrylic copolymer having hydrolyzable silyl group. However there is a problem in that curing speed is slow and adhesion and followability of a cured article thus obtained to a substrate are not sufficient.

DISCLOSURE OF INVENTION

An object of the present invention is to provide a curable polymer composition that is quickly curable to form a cured article having excellent adhesion and followability to a substrate.

The present invention relates to a curable polymer composition at least comprising:
(A) an acrylic polymer having a hydrogen atom bonded to a silicon atom,
(B) a compound having at least two aliphatic unsaturated bonds in one molecule thereof,
(C) a fluoroolefin copolymer comprising vinylidene fluoride as main component, and
(D) a catalyst for hydrosilylation reaction,
wherein the component (B) is contained in such an amount as to give an amount of aliphatic unsaturated bonds in the component (B) of 0.01 to 20 moles based on 1 mole of the hydrogen atom bonded to the silicon atom in the component (A),
an amount of the component (C) is 1 to 10,000 parts by mass based on 100 parts by mass of the component (A), and
an amount of the component (D) is a catalytic amount.

BEST MODE FOR CARRYING OUT THE INVENTION

The acrylic polymer of the component (A) is a component having a hydrogen atom bonded to a silicon atom and being cured by crosslinking with the component (B), and is preferably a homopolymer of ($A_1$) a siloxane macro monomer having a hydrogen atom bonded to a silicon atom and an acryloyloxyalkyl or methacryloyloxyalkyl group bonded to the silicon atom in its molecule or a copolymer of ($A_1$) the siloxane macro monomer having a hydrogen atom bonded to a silicon atom and an acryloyloxyalkyl or methacryloyloxyalkyl group bonded to the silicon atom in its molecule and ($A_2$) an ethylenically unsaturated monomer.

The component ($A_1$) is preferably a siloxane macro monomer represented by the general formula (I):

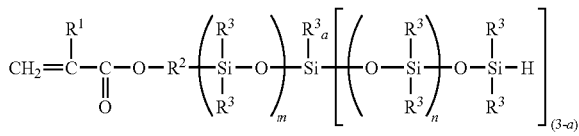

wherein $R^1$ is a hydrogen atom or methyl; $R^2$ is an alkylene group; $R^3$ is an alkyl group or an aryl group; a is 0, 1 or 2; m is 0 or an integer of 1 to 100; n is 0 or an integer of 1 to 100, a siloxane macro monomer represented by the general formula (II):

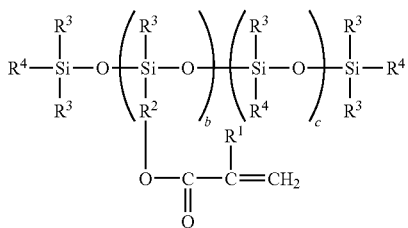

wherein $R^1$ is a hydrogen atom or methyl; $R^2$ is an alkylene group; $R^3$ is an alkyl group or an aryl group; $R^4$ is a hydrogen atom or the group represented by $R^3$ mentioned above, and at least one $R^4$ is a hydrogen atom; b is an integer of 1 to 100; c is 0 or an integer of 1 to 100, or a siloxane macro monomer represented by the general formula (III):

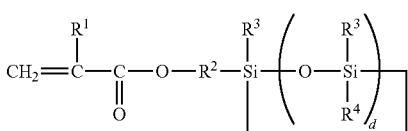

wherein $R^1$ is a hydrogen atom or methyl; $R^2$ is an alkylene group; $R^3$ is an alkyl group or an aryl group; $R^4$ is a hydrogen atom or the group represented by $R^3$ mentioned above, and at least one $R^4$ is a hydrogen atom; d is an integer of 3 to 20.

In the siloxane macro monomer represented by the general formula (I), $R^1$ is a hydrogen atom or methyl, preferably methyl. In the formula, $R^2$ is an alkylene group, and examples thereof are methylene, ethylene, propylene and butylene, preferably propylene. Also in the formula, $R^3$ is an alkyl group or an aryl group, and examples thereof are alkyl groups such as methyl, ethyl, propyl, butyl and pentyl, and aryl groups such as phenyl, tolyl and xylyl, preferably methyl and phenyl. In the formula, a is 0, 1 or 2, preferably 0. Also in the formula, m is an integer within a range from 0 to 100, preferably an integer within a range from 0 to 50, especially preferably an integer within a range from 0 to 10. Also in the formula, n is an integer within a range from 0 to 100, preferably an integer within a range from 0 to 50, especially preferably an integer within a range from 0 to 10.

Examples of the siloxane macro monomer represented by the general formula (I) are as follows.

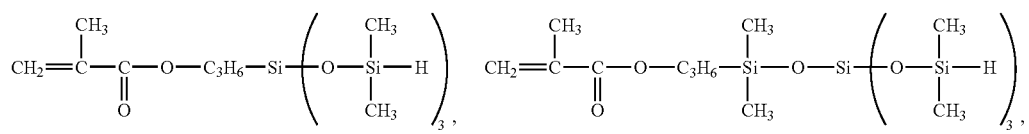

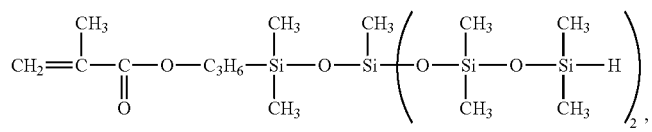

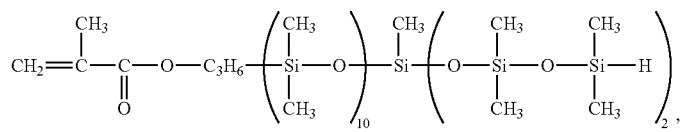

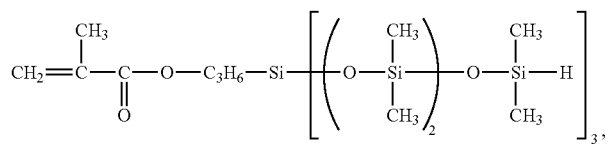

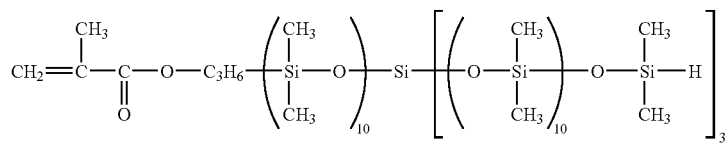

Then, in the siloxane macro monomer represented by the general formula (II), $R^1$ is a hydrogen atom or methyl, preferably methyl. In the formula, $R^2$ is an alkylene group, and examples thereof are the same groups as those mentioned above, preferably propylene. Also in the formula, $R^3$ is an alkyl group or an aryl group, and examples thereof are the same groups as those mentioned above, preferably methyl and phenyl. In the formula, $R^4$ is a hydrogen atom or the group represented by $R^3$ mentioned above, and at least one $R^4$ is a hydrogen atom. Also in the formula, b is an integer within a range from 1 to 100, preferably an integer within a range from 1 to 50, especially preferably an integer within a range from 1 to 10. Also in the formula, c is an integer within a range from 0 to 100, preferably an integer within a range from 0 to 50, especially preferably an integer within a range from 0 to 10.

Examples of the siloxane macro monomer represented by the general formula (II) are as follows.

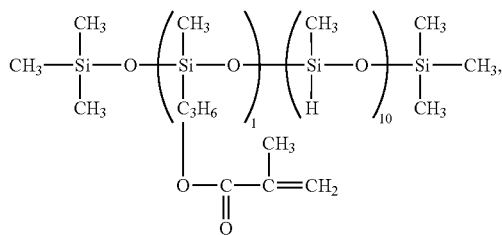

-continued

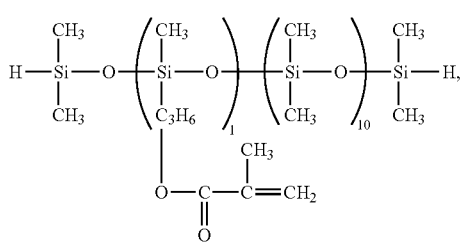

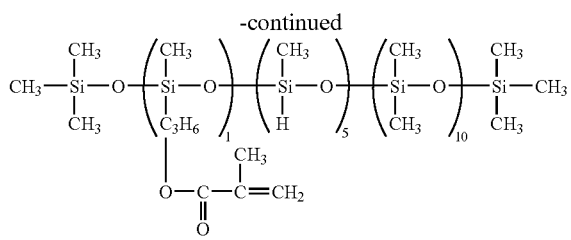

In the siloxane macro monomer represented by the general formula (III), $R^1$ is a hydrogen atom or methyl, preferably methyl. In the formula, $R^2$ is an alkylene group, and examples thereof are the same groups as those mentioned above, preferably propylene. Also in the formula, $R^3$ is an alkyl group or an aryl group, and examples thereof are the same groups as those mentioned above, preferably methyl and phenyl. In the formula, $R^4$ is a hydrogen atom or the group represented by $R^3$ mentioned above, and at least one $R^4$ is a hydrogen atom. Also in the formula, d is an integer within a range from 3 to 20, preferably an integer within a range from 3 to 10, especially preferably an integer within a range from 3 to 5.

Examples of the siloxane macro monomer represented by the general formula (III) are as follows.

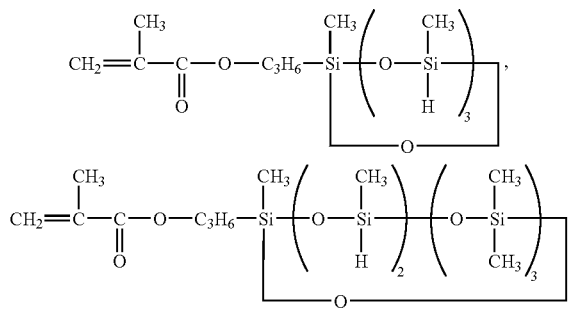

Examples of the ethylenically unsaturated monomer of the component ($A_2$) are, for instance, acryls (excluding the siloxane macro monomer ($A_1$)), vinyl ethers, vinyl esters and aromatic vinyls.

Examples of acryls are, for instance, methyl (meth)acrylate, ethyl (meth)acrylate, n-butyl (meth)acrylate, iso-butyl (meth)acrylate, tert-butyl (meth)acrylate, 2-ethylhexyl (meth)acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth)acrylate, an adduct of 2-hydroxyethyl (meth)acrylate and poly-ε-caprolactone (for example, PLACCEL FM1 available from DAICEL CHEMICAL INDUSTRIES, LTD.), glycidyl (meth)acrylate, 3-trimethoxysilylpropyl (meth)acrylate, 3-triethoxysilylpropyl (meth)acrylate, 3-dimethoxymethylsilylpropyl (meth)acrylate, 2-acrylamide-2-methylpropanesulfonic acid, acid phosphoxypropyl methacrylate, tributyl tin (meth)acrylate, (meth)acrylamide, (meth)acryloyl isocyanate, ethyl 2-isocyanate (meth)acrylate and cyclohexyl (meth)acrylate. Among these acryls, preferable are alkyl (meth)acrylates having an alkyl group of C1 to C6 from the viewpoint of compatibility with the fluoroolefin copolymer of the component (C) and hardness of a cured film.

Examples of vinyl ethers are, for instance, alkyl vinyl ethers such as methyl vinyl ether, ethyl vinyl ether, n-propyl vinyl ether, n-butyl vinyl ether, iso-butyl vinyl ether, tert-butyl vinyl ether, n-pentyl vinyl ether, n-hexyl vinyl ether, n-octyl vinyl ether, 2-ethylhexyl vinyl ether, 2-acetoxyethyl vinyl ether and 2-chloroethyl vinyl ether; cycloalkyl vinyl ethers such as cyclopentyl vinyl ether, cyclohexyl vinyl ether, methylcyclohexyl vinyl ether and cyclooctyl vinyl ether; vinyl ethers having an aromatic group such as benzyl vinyl ether, phenethyl vinyl ether and phenyl vinyl ether; and fluoroalkyl vinyl ethers such as 2,2,2-trifluoroethyl vinyl ether, 2,2,3,3-tetrafluoropropyl vinyl ether, 2,2,3,3,3-pentafluoropropyl vinyl ether, 2,2,3,3,4,4,5,5-octafluoropentyl vinyl ether, 2,2,3,3,4,4,5,5,6,6,7,7,8,8,9,9-hexadecafluorononyl vinyl ether, perfluoromethyl vinyl ether, perfluoroethyl vinyl ether and perfluoropropyl vinyl ether.

Examples of vinyl esters are, for instance, vinyl acetate, allyl acetate, vinyl propionate, vinyl butyrate, vinyl caproate, vinyl pivalate, vinyl benzoate, vinyl p-tert-butyl-benzoate and vinyl cyclohexane-carboxylate.

Examples of aromatic vinyl monomers are, for instance, aromatic styrene derivatives such as styrene, α-methylstyrene, p-methylstyrene and p-methoxystyrene.

Further various copolymerizable monomers may be used as the ethylenically unsaturated monomer of the component ($A_2$). Examples of such monomers are ethylene, propylene, isobutylene, vinyl chloride, vinylidene chloride, maleic anhydride, diesters of fumaric acid, diesters of maleic acid and acrylonitrile.

A process for preparing the component (A) is not limited particularly. When preparing a copolymer, it can be prepared by polymerizing the component ($A_1$) and the component ($A_2$) by a known solution polymerization method. In that case, the proportion of the component ($A_1$) to the component ($A_2$) is not particularly limited, and the proportion of the component ($A_1$) is preferably within a range from 0.01 to 99% by mole, further preferably within a range from 0.01 to 25% by mole, especially preferably within a range from 0.1 to 10% by mole. When the proportion of the component ($A_1$) is less than the lower limit of the above-mentioned range, a crosslinking density of an obtained cured article becomes insufficient, and there is a tendency that strength of the coating film is decreased and solvent resistance and weather resistance are lowered. On the other hand, when the proportion of the component ($A_1$) exceeds the upper limit of the above-mentioned range, a crosslinking density of the obtained cured article becomes too high and post-processability and impact resistance of the coating film tend to be lowered. In addition, the molecular weight of the component (A) is not particularly limited, and its number average molecular weight measured by gel permeation chromatography (GPC) is preferably within a range from 10,000 to 100,000, especially preferably within a range from 20,000 to 40,000. When the number average molecular weight of the component (A) is less than the lower limit of the above-mentioned range, the strength of an obtained coating film is decreased, cracking is apt to occur at post-processing and weather resistance tends to be lowered. On the other hand, when the number average molecular weight of the component (A) exceeds the upper limit of the above-mentioned range, a viscosity becomes high and handling property tends to be lowered. Further, when considering curability of the coating film, a content of hydrogen atom bonded to a silicon atom in the component (A) is preferably within a range from 0.001 to 0.8% by mass, especially preferably within a range from 0.005 to 0.4% by mass.

The component (B) is a component for crosslinking the component (A) and is a compound having at least two aliphatic unsaturated bonds in one molecule thereof. Examples of the component (B) are a siloxane compound having at least two alkenyl groups in one molecule thereof, a cyanurate compound having at least two alkenyl groups in one molecule thereof, a polyoxyalkylene compound terminated with alkenyl groups at both of polymer ends, an ether compound having at least two alkenyl groups in one molecule thereof and a mixture of two or more kinds of these compounds.

Examples of the siloxane compound having at least two alkenyl groups in one molecule thereof in the component (B) are a siloxane compound represented by the general formula (IV):

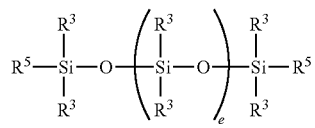

wherein $R^3$ is an alkyl group or an aryl group; $R^5$ is an alkenyl group; e is 0 or an integer of 1 to 10, a siloxane compound represented by the general formula (V):

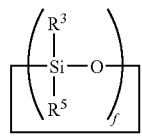

wherein $R^3$ is an alkyl group or an aryl group; $R^5$ is an alkenyl group; f is an integer of 4 to 10, and a siloxane compound represented by the general formula (VI):

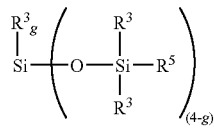

wherein $R^3$ is an alkyl group or an aryl group; $R^5$ is an alkenyl group; g is 0, 1 or 2.

In the siloxane compound represented by the general formula (IV), $R^3$ is an alkyl group or an aryl group, and examples thereof are the same groups as those mentioned above, preferably methyl and phenyl. Also in the formula, $R^5$ is an alkenyl group, and examples thereof are vinyl, allyl, butenyl, pentenyl and hexenyl, preferably vinyl. Also in the formula, e is 0 or an integer of 1 to 10, preferably 0 or an integer of 1 to 5, especially preferably 0.

Examples of such a siloxane compound represented by the general formula (IV) are as follows.

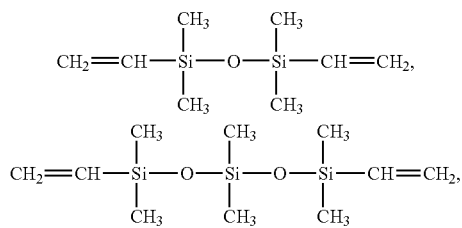

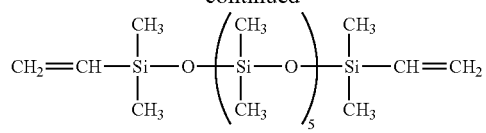

In the siloxane compound represented by the general formula (V), $R^3$ is an alkyl group or an aryl group, and examples thereof are the same groups as those mentioned above, preferably methyl and phenyl. Also in the formula, $R^5$ is an alkenyl group, and examples thereof are the same groups as those mentioned above, preferably vinyl. Also in the formula, f is an integer of 4 to 10, preferably an integer of 4 to 6, especially preferably 4.

Examples of such a siloxane compound represented by the general formula (V) are as follows.

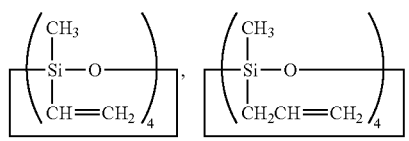

In the siloxane compound represented by the general formula (VI), $R^3$ is an alkyl group or an aryl group, and examples thereof are the same groups as those mentioned above, preferably methyl and phenyl. Also in the formula, $R^5$ is an alkenyl group, and examples thereof are the same groups as those mentioned above, preferably vinyl. Also in the formula, g is 0, 1 or 2, preferably 0.

Examples of such a siloxane compound represented by the general formula (VI) are as follows.

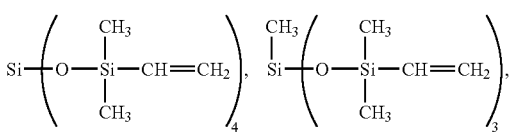

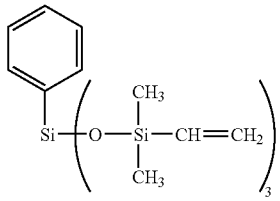

In addition, example of the cyanurate compound having at least two alkenyl groups in one molecule thereof in the component (B) is triallyl isocyanurate.

Also, examples of the polyoxyalkylene compound terminated with alkenyl groups at both of polymer ends in the component (B) are polyoxyethylene terminated with allyl groups at both of polymer ends and an oxyethylene-oxypropylene copolymer terminated with allyl groups at both of polymer ends.

Also, examples of the ether compound having at least two alkenyl groups in one molecule thereof in the component (B) are pentaerythritol tetraallyl ether and triallyl glycidyl ether.

The component (B) is contained in such an amount as to give an amount of aliphatic unsaturated bonds in this component of 0.01 to 20 moles, preferably 0.01 to 10 moles, especially preferably 0.05 to 5 moles based on 1 mole of the hydrogen atom bonded to the silicon atom in the component (A). This is because when an amount of aliphatic unsaturated bonds in the component (B) is less than the lower limit of the above-mentioned range, mechanical strength of the obtained cured article is decreased, and on the other hand, when exceeding the upper limit of the above-mentioned range, the obtained composition is not sufficiently cured.

The fluoroolefin copolymer of the component (C) is a solvent soluble copolymer comprising vinylidene fluoride as main component and at least one other fluoroolefin monomer. A composition and molecular weight of this fluoroolefin copolymer may be optionally set within a range where it is soluble in a solvent. The fluoroolefin monomer is not particularly limited, and examples thereof are vinyl fluoride, trifluoroethylene, tetrafluoroethylene, chlorotrifluoroethylene, hexafluoropropylene and perfluoroalkyl trifluoroalkyl ether, where the number of carbon atoms of the perfluoroalkyl group is preferably 1 to 18. The perfluoroalkyl group is one in which a part or the whole of carbon atoms of the alkyl group are replaced by fluorine atoms.

In this fluoroolefin copolymer, the proportion of the unit derived from vinylidene fluoride is preferably not less than 50% by mole, further preferably 60 to 90% by mole. This is because when the proportion of the unit derived from vinylidene fluoride is less than the lower limit of the above-mentioned range, the copolymer tends to hardly dissolve in a solvent, and on the other hand, when exceeding the upper limit of the above-mentioned range, since the solvent capable of dissolving the copolymer is limited to those having a very high polarity and a high boiling point such as N,N-dimethylformamide and N,N-dimethylacetamide, a tendency is such that it takes a time for drying the composition when used for a coating.

The molecular weight of this fluoroolefin copolymer is not particularly limited, and its number average molecular weight measured by gel permeation chromatography (GPC) is preferably within a range from 10,000 to 120,000, further preferably within a range from 10,000 to 70,000. This is because when the number average molecular weight is less than the lower limit of the above-mentioned range, there is a tendency that strength of the coating film of the obtained cured article is decreased and cracking occurs easily, and on the other hand, when exceeding the upper limit of the above-mentioned range, the copolymer tends to be hardly dissolved in general purpose solvents.

Examples of the component (C) are, for instance, a VdF (vinylidene fluoride)-TFE (tetrafluoroethylene)-CTFE (chlorotrifluoroethylene) copolymer, a VdF-TFE-HFP (hexafluoropropylene) copolymer and a VdF-TFE copolymer since they are well dissolved in a solvent and a coating film is easily formed. Those fluoroolefin copolymers may be used alone, or may be used in combination of two or more kinds thereof.

The amount of the component (C) in the composition of the present invention is within a range from 1 to 10,000 parts by mass, preferably within a range from 10 to 900 parts by mass, further preferably within a range from 30 to 400 parts by mass based on 100 parts by mass of the component (A). This is because when the amount of the component (C) is less than the lower limit of the above-mentioned range, weather resistance, corrosion resistance and stain resistance of the obtained cured film are lowered, and on the other hand, when exceeding the upper limit of the above-mentioned range, adhesion of the obtained cured film to a substrate is lowered.

Examples of the catalyst for hydrosilylation reaction of the component (D) are, for instance, platinum catalysts such as fine powder of platinum, platinum black, chloroplatinic acid, platinum tetrachloride, alcohol-modified chloroplatinic acid, olefin complex of platinum, alkenyl siloxane complex of platinum, carbonyl complex of platinum, and powders of thermoplastic organic resins such as methyl methacrylate resin, polycarbonate resin, polystyrene resin and silicone resin containing the above-mentioned platinum catalysts; rhodium catalysts represented by the formulae: $[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)$, $RhX_3[(R)_2S]_3$, $(R^2{}_3P)_2Rh(CO)X$, $(R^2{}_3P)_2Rh(CO)H$, $R_2X_2Y_4$, $H_aRh_b(En)_cCl_d$ and $Rh[O(CO)R]_{3-n}(OH)_n$, where X is a hydrogen atom, a chlorine atom, a bromine atom or an iodine atom; Y is an alkyl group such as methyl or ethyl, CO, $C_8H_{14}$ or $0.5C_8H_{12}$; R is an alkyl group, a cycloalkyl group or an aryl group; $R^2$ is an alkyl group, an aryl group, an alkyloxy group or an aryloxy group; En is an olefin; a is 0 or 1; b is 1 or 2; c is an integer of 1 to 4; d is 2, 3 or 4; n is 0 or 1; and iridium catalysts represented by the formulae: $Ir(OOCCH_3)_3$, $Ir(C_5H_7O_2)_3$, $[Ir(Z)(En)_2]_2$ and $[Ir(Z)(Dien)]_2$, where Z is a chlorine atom, a bromine atom, an iodine atom or an alkoxyl group; En is an olefin; Dien is cyclooctadiene.

The amount of the component (D) is a catalytic amount, and concretely in the composition of the present invention, the component (D) is contained in such an amount as to give an amount of catalytic metal in the component (D) of preferably within a range from 0.1 to 500 ppm, further preferably within a range from 1 to 100 ppm in a mass unit. This is because when the amount of catalytic metal in the component (D) is less than the lower limit of the above-mentioned range, curing of the obtained composition tends to become remarkably slow, and on the other hand, when exceeding the upper limit of the above-mentioned range, the obtained cured article tends to be colored and curability is not so improved, which is, in some cases, disadvantageous from an economical point of view.

The composition of the present invention may contain a curing inhibitor for enhancing storage stability of the composition of the present invention and workability in handling thereof. Examples of the curing inhibitor are alkyne alcohols such as 2-methyl-3-butyn-2-ol, 3,5-dimethyl-1-hexyn-3-ol and 2-phenyl-3-butyn-2-ol; en-yne compounds such as 3-methyl-3-penten-1-yne and 3,5-dimethyl-3-hexen-1-yne; and benzotriazole. The amount of this curing inhibitor is preferably within a range from 10 to 50,000 ppm in a mass unit based on the composition of the present invention.

The composition of the present invention may contain a solvent (E) for enhancing workability in handling the composition of the present invention and coatability thereof. Examples of the solvent are those being capable of dissolving the components (A) to (D) at a temperature of not more than a boiling point thereof, and among them, those having a boiling point of not more than 280° C., especially not more than 180° C. are preferable. Examples thereof are ketones such as acetone, cyclohexanone, isophorone, mesityl oxide, diacetone alcohol, methyl ethyl ketone, methyl isopropyl ketone and methyl isobutyl ketone; esters of acetic acid such as ethyl acetate, n-butyl acetate and t-butyl acetate; alkyl esters or alkoxyalkyl esters of aliphatic or aromatic carboxylic acids such as dimethyl adipate, diethyl succinate, dimethyl phthalate and 2-methoxyethyl acetate; glycol ethers and esters such as diethylene glycol monoethyl ether acetate; cyclic ethers such as dioxane and tetrahydrofuran; carbonic acid esters such as propylene carbonate; lactones such as butyrolactone; and amides such as N,N-dimethylacetamide and N,N-dimethylformamide. Those solvents may be used alone or may be used in combination of two or more kinds thereof. In addition, if necessary, other organic solvents such as xylene and toluene may be contained within a range of not more than 50% by weight of all of the solvents as a whole.

Further as the case demands, the composition of the present invention may contain various general purpose additives, for example, pigments such as titanium oxide, red iron oxide and carbon black; benzophenone ultraviolet absorber or other ultraviolet absorber; hindered amine photostabilizer or other photostabilizer; an antigelling agent; and a leveling agent.

The process for preparing the composition of the present invention is not limited particularly, and the composition can be prepared by mixing the above-mentioned components by a usual method.

EXAMPLES

The curable polymer composition of the present invention is next explained in detail by means of Examples and Comparative Examples. In the Examples and Comparative Examples, adhesion, secondary adhesion, pencil hardness and post-processability of coating films are evaluated in such manner as mentioned below.

(Adhesion)

According to JIS K 5400, a cross cut test is carried out using an aluminum substrate, an electro-galvanized steel sheet and a stainless steel (SUS) sheet.

Aluminum substrate: JIS H 4000A-1050P AM-712 aluminum sheet

Electro-galvanized steel sheet: JIS G 3141 (SPCC to SD) cold-rolled steel sheet, SURFDINE SELECT 1000

Stainless steel (SUS) sheet: JIS G 4305 SUS304

(Secondary Adhesion)

According to JIS K 5400, a cross cut test is carried out using the test sheets prepared in the same manner as in the adhesion test after dipping in hot water of 50° C. for three days.

(Pencil Hardness)

A test stipulated in JIS K 5400 is carried out after coating on an aluminum substrate (JIS H 4000A-1050P AM-712) and a stainless steel (SUS) sheet (JIS G 4305 SUS304).

(Post-Processability)

After coating on an aluminum substrate (JIS H 4000A-1050P AM-712), the coated substrate is bent by the method (bending test) described in JIS K 5400 and is evaluated by the criteria stipulated therein.

The components used in Examples and Comparative Examples are as follows.

(A-1): Copolymer comprising methyl methacrylate, butyl acrylate and a siloxane macro monomer represented by the formula:

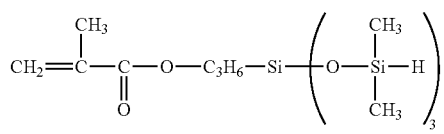

(monomer ratio=70/5/25, number average molecular weight=35,320, content of hydrogen atom bonded to silicon atom=0.091% by mass)

(A-2): Copolymer comprising methyl methacrylate, butyl acrylate and a siloxane macro monomer represented by the formula:

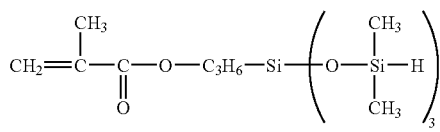

(monomer ratio=70/15/15, number average molecular weight=32,350, content of hydrogen atom bonded to silicon atom=0.053% by mass)

(A-3): Copolymer comprising methyl methacrylate, butyl acrylate and a siloxane macro monomer represented by the formula:

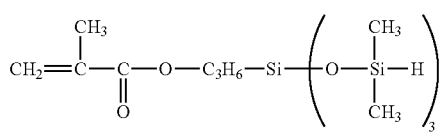

(monomer ratio=70/25/5, number average molecular weight=24,770, content of hydrogen atom bonded to silicon atom=0.017% by mass)

(A-4): Polymethyl methacrylate (A-5): Copolymer of methyl methacrylate and butyl acrylate (monomer ratio=70/30)

(B-1): Siloxane compound represented by the formula:

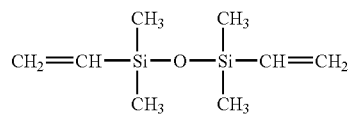

(B-2): Siloxane compound represented by the formula:

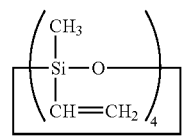

(B-3): Siloxane compound represented by the formula:

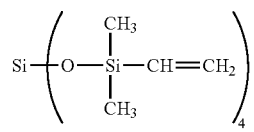

(B-4): Triallyl isocyanurate (C-1): VdF (vinylidene fluoride)-TFE (tetrafluoroethylene)-CTFE (chlorotrifluoroethylene) copolymer (monomer ratio=71/21/8)

(D-1): 1,3-Divinyltetramethyldisiloxane solution of 1,3-divinyltetramethyldisiloxane complex of platinum Examples 1 to 6 and Comparative Examples 1 to 4

Curable polymer compositions were prepared with the components shown in Table 1. Next, these compositions were dissolved in n-butyl acetate so that a solid concentration became 25% by weight, and the respective solutions were spray-coated on a specified test sheet and subjected to heating at 230° C. for four minutes to form coating films. Adhesion, secondary adhesion, pencil hardness and post-processability of the obtained coating films were evaluated. The results are shown in Table 1.

TABLE 1

| Components of curable polymer composition (part by weight) | Example | | | | | |
|---|---|---|---|---|---|---|
| | 1 | 2 | 3 | 4 | 5 | 6 |
| (A-1) | 40.2 | — | — | — | — | — |
| (A-2) | — | 43.6 | — | — | — | — |
| (A-3) | — | — | 47.7 | 47.8 | 47.3 | 47.9 |
| (A-4) | — | — | — | — | — | — |
| (A-5) | — | — | — | — | — | — |
| (B-1) | 9.8 | 6.4 | 2.3 | — | — | — |
| (B-2) | — | — | — | 2.2 | — | — |
| (B-3) | — | — | — | — | 2.7 | — |
| (B-4) | — | — | — | — | — | 2.1 |
| (C-1) | 50 | 50 | 50 | 50 | 50 | 50 |
| (D-1) * | 50 | 50 | 50 | 50 | 50 | 50 |

| Characteristics of coating film | Example | | | | | |
|---|---|---|---|---|---|---|
| | 1 | 2 | 3 | 4 | 5 | 6 |
| Adhesion | | | | | | |
| Aluminum sheet | 100/100 | 100/100 | 100/100 | 100/100 | 100/100 | 100/100 |
| Electro-galvanized steel sheet | 100/100 | 100/100 | 100/100 | 100/100 | 100/100 | 100/100 |
| Stainless steel (SUS) sheet | 100/100 | 100/100 | 100/100 | 100/100 | 100/100 | 100/100 |
| Secondary adhesion | | | | | | |
| Aluminum sheet | 100/100 | 100/100 | 100/100 | 100/100 | 100/100 | 100/100 |
| Electro-galvanized steel sheet | 100/100 | 100/100 | 100/100 | 100/100 | 100/100 | 100/100 |
| Stainless steel (SUS) sheet | 100/100 | 100/100 | 100/100 | 100/100 | 100/100 | 100/100 |
| Pencil hardness | | | | | | |
| Aluminum sheet | 2H | 3H | 3H | 3H | 3H | 3H |
| Stainless steel (SUS) sheet | HB | 2H | 3H | 3H | 2H | 2H |
| Post-processability | 2T | 1T | 0T | 0T | 0T | 0T |

| Components of curable polymer composition (part by weight) | Comparative Example | | | |
|---|---|---|---|---|
| | 1 | 2 | 3 | 4 |
| (A-1) | — | — | — | — |
| (A-2) | — | — | — | — |
| (A-3) | — | — | — | — |
| (A-4) | 50 | — | 100 | 47.7 |
| (A-5) | — | 50 | — | — |
| (B-1) | — | — | — | 2.3 |
| (B-2) | — | — | — | — |
| (B-3) | — | — | — | — |
| (B-4) | — | — | — | — |
| (C-1) | 50 | 50 | — | 50 |
| (D-1) * | — | — | — | 50 |

| Characteristics of coating film | Comparative Example | | | |
|---|---|---|---|---|
| | 1 | 2 | 3 | 4 |
| Adhesion | | | | |
| Aluminum sheet | 100/100 | 100/100 | 100/100 | 100/100 |
| Electro-galvanized steel sheet | 0/100 | 0/100 | 0/100 | 0/100 |
| Stainless steel (SUS) sheet | 0/100 | 0/100 | 0/100 | 0/100 |
| Secondary adhesion | | | | |
| Aluminum sheet | 0/100 | 0/100 | 0/100 | 0/100 |
| Electro-galvanized steel sheet | 0/100 | 0/100 | 0/100 | 0/100 |
| Stainless steel (SUS) sheet | 0/100 | 0/100 | 0/100 | 0/100 |

TABLE 1-continued

| | Pencil hardness | | | |
|---|---|---|---|---|
| Aluminum sheet | 2H | F | 4H | 2H |
| Stainless steel (SUS) sheet | 2H | F | 4H | 2H |
| Post-processability | 4T | 1T | >4T | 4T |

* The content of component (D-1) represents the content (ppm) of platinum atom in a mass unit based on the composition.

INDUSTRIAL APPLICABILITY

The composition of the present invention is quickly curable to form a cured article having excellent adhesion and followability to a substrate, and therefore is useful as a weather resistant and corrosion resistant coating for general building materials (roof, wall), chemical plant and exterior of automobiles, and a stain-proof and weather resistant coating for marble and wood for interior and exterior uses.

The invention claimed is:

1. A curable polymer composition at least comprising:
(A) an acrylic polymer having a hydrogen atom bonded to a silicon atom,
(B) a compound having at least two aliphatic unsaturated bonds in one molecule thereof,
(C) a fluoroolefin copolymer comprising vinylidene fluoride as main component, and
(D) a catalyst for hydrosilylation reaction,
wherein the component (B) is contained in such an amount as to give an amount of aliphatic unsaturated bonds in the component (B) of 0.01 to 20 moles based on 1 mole of the hydrogen atom bonded to the silicon atom in the component (A),
an amount of the component (C) is 1 to 10,000 parts by mass based on 100 parts by mass of the component (A), and
an amount of the component (D) is a catalytic amount.

2. The curable polymer composition of claim 1, wherein the component (A) is a copolymer of ($A_1$) a siloxane macro monomer having a hydrogen atom bonded to a silicon atom and an acryloyloxyalkyl or methacryloyloxyalkyl group bonded to the silicon atom in its molecule and ($A_2$) an ethylenically unsaturated monomer.

3. The curable polymer composition of claim 2, wherein the component ($A_1$) is a siloxane macro monomer represented by the general formula (I):

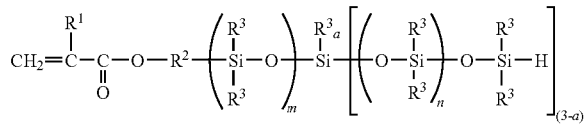

wherein $R^1$ is a hydrogen atom or methyl; $R^2$ is an alkylene group; $R^3$ is an alkyl group or an aryl group; a is 0, 1 or 2; m is 0 or an integer of 1 to 100; n is 0 or an integer of 1 to 100, a siloxane macro monomer represented by the general formula (II):

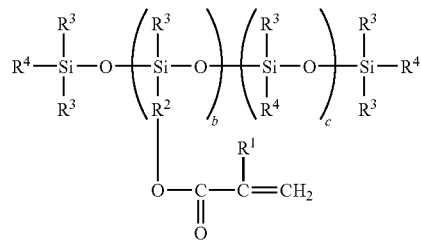

wherein $R^1$ is a hydrogen atom or methyl; $R^2$ is an alkylene group; $R^3$ is an alkyl group or an aryl group; $R^4$ is a hydrogen atom or the group represented by $R^3$ mentioned above, and at least one $R^4$ is a hydrogen atom; b is an integer of 1 to 100; c is 0 or an integer of 1 to 100, or a siloxane macro monomer represented by the general formula (III):

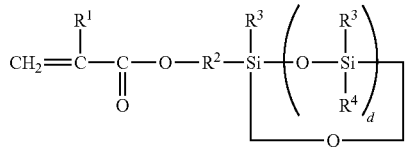

wherein $R^1$ is a hydrogen atom or methyl; $R^2$ is an alkylene group; $R^3$ is an alkyl group or an aryl group; $R^4$ is a hydrogen atom or the group represented by $R^3$ mentioned above, and at least one $R^4$ is a hydrogen atom; d is an integer of 3 to 20.

4. The curable polymer composition of claim 1, wherein the component (B) is a siloxane compound having at least two alkenyl groups in one molecule thereof, a cyanurate compound having at least two alkenyl groups in one molecule thereof, a polyoxyalkylene compound terminated with alkenyl groups at both of polymer ends or an ether compound having at least two alkenyl groups in one molecule thereof.

5. The curable polymer composition of claim 1, wherein the component (C) is a vinylidene fluoride-tetrafluoroethylene-chlorotrifluoroethylene copolymer, a vinylidene fluoride-tetrafluoroethylene-hexafluoropropylene copolymer or a vinylidene fluoride-tetrafluoroethylene copolymer.

6. The curable polymer composition of claim 1, further containing a solvent (E) in an optional amount.

* * * * *